(12) United States Patent
Ahn et al.

(10) Patent No.: US 10,733,719 B2
(45) Date of Patent: Aug. 4, 2020

(54) WAFER INSPECTION APPARATUS AND WAFER INSPECTION METHOD USING THE SAME

(71) Applicant: SAMSUNG ELECTRONICS CO., LTD., Suwon-si, Gyeonggi-Do (KR)

(72) Inventors: Tae Heung Ahn, Seoul (KR); Soo Ryonng Kim, Suwon-si (KR); Tae Joong Kim, Hwaseong-si (KR); Jun Bum Park, Goyang-si (KR); Byeong Hwan Jeon, Yongin-si (KR); Jae Chol Joo, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 322 days.

(21) Appl. No.: 15/466,951

(22) Filed: Mar. 23, 2017

(65) Prior Publication Data

US 2018/0061041 A1 Mar. 1, 2018

(30) Foreign Application Priority Data

Aug. 23, 2016 (KR) .................. 10-2016-0106918

(51) Int. Cl.
*H04N 5/225* (2006.01)
*G06T 7/00* (2017.01)
*G01B 11/27* (2006.01)
*G01N 21/95* (2006.01)

(52) U.S. Cl.
CPC .......... *G06T 7/0004* (2013.01); *G01B 11/272* (2013.01); *G01N 21/9501* (2013.01); *H04N 5/2256* (2013.01); *H04N 5/2257* (2013.01); *G06T 2207/30148* (2013.01)

(58) Field of Classification Search
CPC ............. G01B 11/272; G01N 21/9501; G06T 2207/30148; G06T 7/0004; H04N 5/2256; H04N 5/2257
See application file for complete search history.

(56) References Cited

U.S. PATENT DOCUMENTS

| | | | |
|---|---|---|---|
| 6,457,645 B1 * | 10/2002 | Gardner, Jr. ....... | G06K 7/10702 235/462.23 |
| 7,652,276 B2 | 1/2010 | Hayakawa et al. | |
| 8,139,107 B2 | 3/2012 | Hayakawa et al. | |
| 8,855,402 B2 | 10/2014 | Tomita et al. | |
| 9,025,854 B2 | 5/2015 | Hayashi | |

(Continued)

FOREIGN PATENT DOCUMENTS

| | | |
|---|---|---|
| JP | 2007-240519 | 9/2007 |
| JP | 2011-145193 | 7/2011 |
| JP | 2011145193 | * 7/2011 |

*Primary Examiner* — Md N Haque
(74) *Attorney, Agent, or Firm* — F. Chau & Associates, LLC

(57) ABSTRACT

A wafer inspection apparatus includes a linear stage configured to support a chuck on which a wafer is disposed and to move the chuck along a guide rail, wherein the guide rail extends in a first direction, an image sensor module overlapping the linear stage, and a rotary stage supported by the linear stage. The rotary stage is configured to rotate the chuck in a state where a center of the wafer is aligned with the image sensor module. The image sensor module includes a light source directing light onto the wafer, and an image sensor extending in a second direction crossing the first direction.

3 Claims, 16 Drawing Sheets

(56) References Cited

U.S. PATENT DOCUMENTS

| | | | |
|---|---|---|---|
| 9,157,869 B2 | 10/2015 | Ortner et al. | |
| 2004/0100297 A1* | 5/2004 | Tanioka | G01R 31/2851 |
| | | | 324/750.1 |
| 2007/0188832 A1* | 8/2007 | Hayakawa | G01N 21/9501 |
| | | | 358/497 |
| 2007/0219736 A1* | 9/2007 | Okita | G03F 7/70525 |
| | | | 702/81 |
| 2007/0229833 A1* | 10/2007 | Rosencwaig | G01B 11/303 |
| | | | 356/426 |
| 2008/0030731 A1* | 2/2008 | Jin | G01N 21/4738 |
| | | | 356/369 |
| 2008/0142733 A1* | 6/2008 | Zywno | H01J 37/20 |
| | | | 250/491.1 |
| 2009/0028683 A1* | 1/2009 | Zywno | B82Y 10/00 |
| | | | 414/754 |
| 2009/0116727 A1* | 5/2009 | Jin | G01N 21/4738 |
| | | | 382/149 |
| 2009/0122304 A1* | 5/2009 | Jin | G01N 21/4738 |
| | | | 356/237.4 |
| 2009/0201579 A1* | 8/2009 | Shibata | G02B 21/365 |
| | | | 359/363 |
| 2015/0177161 A1 | 6/2015 | Jingu | |
| 2015/0226767 A1 | 8/2015 | Akiyama et al. | |

\* cited by examiner

WAFER INSPECTION APPARATUS AND WAFER INSPECTION METHOD USING THE SAME

CROSS-REFERENCE TO RELATED APPLICATION

This application claims priority under 35 U.S.C. § 119 to Korean Patent Application No. 10-2016-0106918, filed on Aug. 23, 2016, in the Korean Intellectual Property Office, the disclosure of which is incorporated by reference herein in its entirety.

TECHNICAL FIELD

The inventive concept relates to wafer inspection, and more particularly, to a wafer inspection apparatus and a method of using the same.

DISCUSSION OF THE RELATED ART

In a manufacturing process of a semiconductor device, whether a defect exists in the semiconductor device is determined by inspecting whether each process has been conducted properly. The processes may be, for example, a photoresist process, an etching process, an ion implant process, and the like. A wafer surface inspection used in the manufacturing process of the semiconductor device may be performed by analyzing an image of a wafer containing the semiconductor device. The image may be generated using an image sensor.

In this case, to obtain a high resolution image of the wafer on which the integrated semiconductor device is formed, a method of moving an image sensor above the surface of the wafer, or a method of moving a chuck on which the wafer is loaded with respect to a static image sensor may be performed.

However, a device used to move the wafer or the image sensor requires a large space and may be costly to operate.

SUMMARY

In an exemplary embodiment of the inventive concept, a wafer inspection apparatus includes a linear stage configured to support a chuck on which a wafer is disposed and to move the chuck along a guide rail, wherein the guide rail extends in a first direction, an image sensor module overlapping the linear stage, and a rotary stage supported by the linear stage. The rotary stage is configured to rotate the chuck in a state where a center of the wafer is aligned with the image sensor module. The image sensor module includes a light source directing light onto the wafer, and an image sensor extending in a second direction crossing the first direction.

In an exemplary embodiment of the inventive concept, a wafer inspection method includes loading a wafer, disposed on a chuck, onto a rotary stage configured to rotate the chuck and a linear stage configured to move the chuck along a guide rail, placing the wafer in a first position, moving the wafer in a first direction to align a center of the wafer with a first portion of an image sensor, acquiring an image of a surface of the wafer using the image sensor, rotating the wafer by a predetermined angle, and unloading the wafer.

In an exemplary embodiment of the inventive concept, a wafer inspection apparatus includes a linear stage, a guide rail disposed on the linear stage, the guide rail extending in a first direction, a rotary stage disposed on the guide rail, a chuck disposed on the rotary stage, wherein the chuck is configured to support a wafer thereon, the linear stage is configured to move the chuck along the guide rail, and the rotary stage is configured to rotate the wafer about a center of the wafer, and an image sensor module overlapping the linear stage and extending in a second direction crossing the first direction, the image sensor module including a light source and an image sensor, wherein the light source is configured to direct light on a surface of the wafer and the image sensor is configured to receive light reflected from the surface of the wafer.

BRIEF DESCRIPTION OF THE DRAWINGS

The above and other features of the inventive concept will become more apparent by describing in detail exemplary embodiments thereof with reference to the accompanying drawings, in which.

DETAILED DESCRIPTION OF THE EMBODIMENTS

Figure 1:
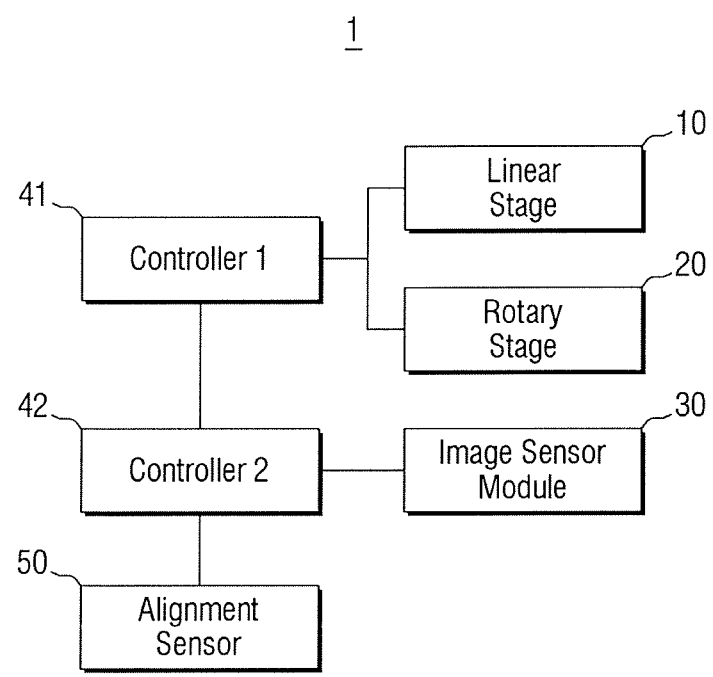
FIG. 1 is a block diagram illustrating a wafer inspection apparatus according to an exemplary embodiment of the inventive concept.
Figure 2:
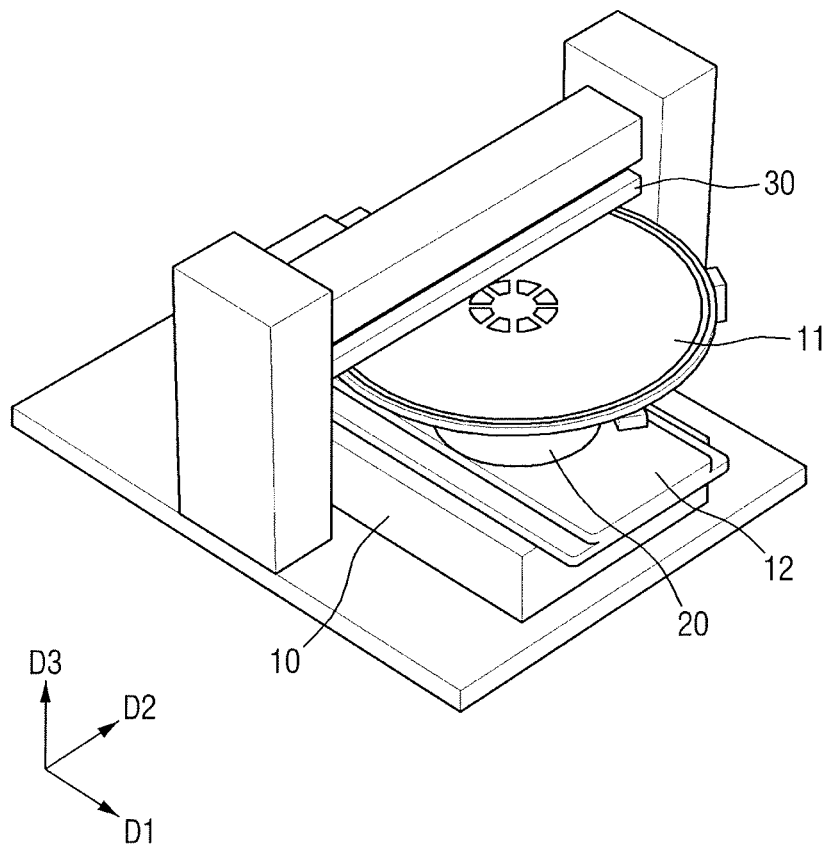
FIG. 2 is a perspective view illustrating a wafer inspection apparatus according to an exemplary embodiment of the inventive concept.

FIG. 1 is a block diagram illustrating a wafer inspection apparatus according to an exemplary embodiment of the inventive concept. FIG. 2 is a perspective view illustrating a wafer inspection apparatus according to an exemplary embodiment of the inventive concept.

Figure 5A:
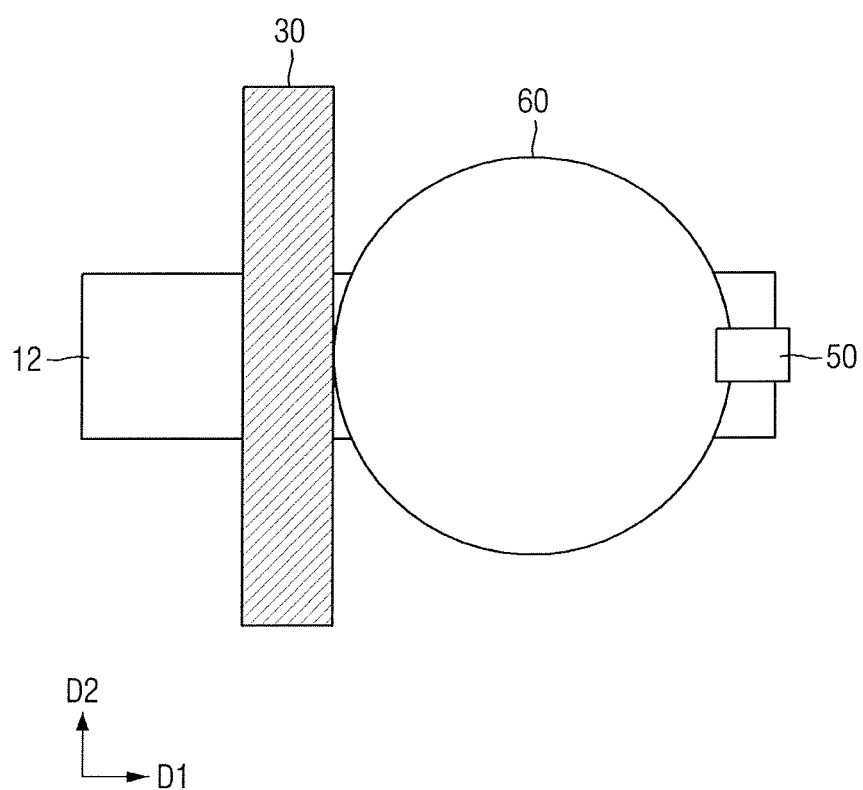
FIGS. 5A to 5D are plan views illustrating a wafer inspection method according to an exemplary embodiment of the inventive concept.

Referring to FIGS. 1 and 2, a wafer inspection apparatus 1, according to an exemplary embodiment of the inventive concept, may include a linear stage 10, a rotary stage 20, an image sensor module 30, a first controller 41 (e.g., a first controlling circuit 41), a second controller 42 (e.g., a second controlling circuit 42), and an alignment sensor 50 (see FIG. 5A).

The linear stage 10 may support and/or move a wafer 60 (see FIG. 3) disposed on a chuck 11 along a guide rail 12. The guide rail 12 may extend in a first direction D1. Further, the linear stage 10 may support both the chuck 11 and the rotary stage 20.

For example, when a wafer 60 is loaded on the chuck 11, the linear stage 10 may support and/or move the wafer 60 in the first direction D1 to align the wafer 60 with the alignment sensor 50, or to align the center of the wafer 60 with a lower portion of the image sensor module 30. The linear stage 10 may move the chuck 11 and the wafer 60 under the control of the first controller 41. For example, the linear stage 10 may move the chuck 11 and the wafer 60 in the first direction D1 under the control of the first controller 41.

In an exemplary embodiment of the inventive concept, an operation of the linear stage 10 may be synchronized with an operation of the image sensor module 30. Accordingly, when the linear stage 10 moves the wafer 60 such that the center of the wafer 60 is aligned with a lower portion of the image sensor module 30, or the wafer 60 is aligned with the alignment sensor 50, the image sensor module 30 may operate at the same time to acquire an image of the surface of the wafer 60. In this case, the first controller 41 and the second controller 42 may control the driving of the linear stage 10 and the driving of the image sensor module 30, respectively, at the same time.

However, in an exemplary embodiment of the inventive concept, during the operation of the linear stage 10, the wafer surface image acquisition operation of the image sensor module 30 may be stopped. These operations of the linear stage 10 and the image sensor module 30 will be described in more detail below.

The rotary stage 20 may rotate the wafer 60 placed on the chuck 11. For example, the rotary stage 20 may rotate the chuck 11 by 180 degrees or 360 degrees to generate an image of the surface of the wafer 60, as described below.

The rotary stage 20 may be disposed between the linear stage 10 and the chuck 11. The rotary stage 20 may be supported by the linear stage 10.

In an exemplary embodiment of the inventive concept, the operation of the rotary stage 20 may be synchronized with the operation of the image sensor module 30 such that the image sensor module 30 can acquire an image of the rotating wafer 60 during the rotation of the rotary stage 20. In this case, the first controller 41 and the second controller 42 may respectively control the operation of the rotary stage 20 and the operation of the image sensor module 30 at the same time.

In an exemplary embodiment of the inventive concept, the wafer surface image acquisition operation of the image sensor module 30 may be stopped during the rotation of the rotary stage 20. The operations of the rotary stage 20 and the image sensor module 30 will be described in more detail below.

The rotary stage 20 may rotate each of the chuck 11 and the wafer 60 placed on the chuck 11 under the control of the first controller 41. Accordingly, the rotary stage 20 and the linear stage 10 may be controlled by the same first controller 41.

The linear stage 10, the rotary stage 20, the image sensor module 30 and other components of in the wafer inspection apparatus 1 may be disposed and accommodated in a chamber.

Figure 3:
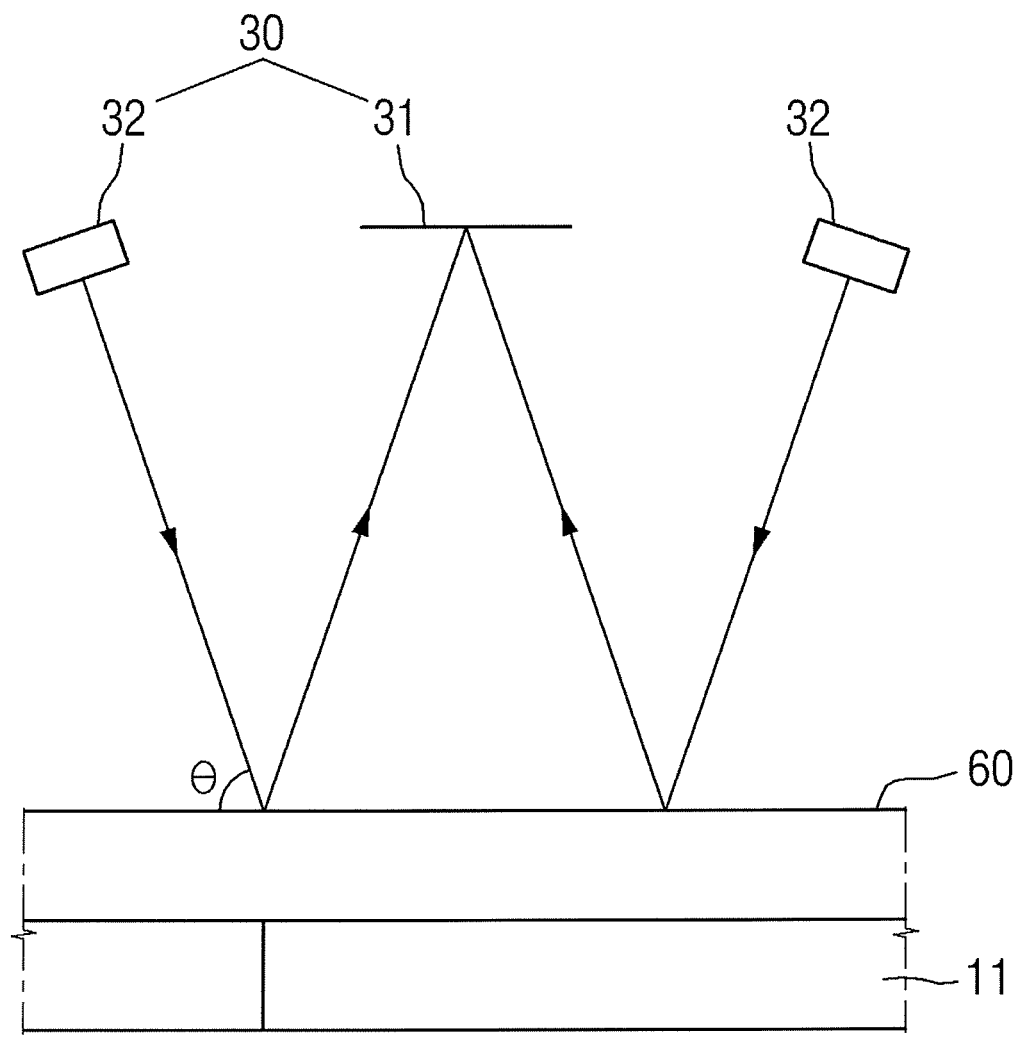
FIG. 3 is a diagram illustrating an operation of an image sensor module included in a wafer inspection apparatus, according to an exemplary embodiment of the inventive concept.

FIG. 3 is a diagram illustrating an operation of an image sensor module included in a wafer inspection apparatus, according to an exemplary embodiment of the inventive concept.

Referring to FIG. 3, the image sensor module 30 may include an image sensor 31, for acquiring an image of the surface of a wafer 60, and a light source 32, for directing light onto the surface of the wafer 60. In an exemplary embodiment of the inventive concept, the light source 32 emits the light directed to the wafer 60.

The image sensor 31 may include, for example, a Charge-Coupled Device (CCD) sensor, but the inventive concept is not limited thereto. For example, the image sensor 31 may include a Complementary Metal-Oxide Sensor (CMOS) sensor.

The image sensor module 30 may include a plurality of image sensors 31. The plurality of image sensors 31 may be arranged in a second direction D2, as shown in FIG. 2. For example, the plurality of image sensors 31 may be arranged in the second direction D2, perpendicular to the first direction D1. The first direction D1 is a moving direction of the linear stage 10 for moving the chuck 11 along the guide rail 12. Thus, the image sensors 31 may acquire reciprocate images (e.g., images of opposite parts) of the surface of the wafer 60 with respect to the image sensor module 30.

In an exemplary embodiment of the inventive concept, an image sensor 31 may employ a line scan method of acquiring an image of an object moving with respect to to an area that faces the image sensor 31.

The light source 32 may be disposed adjacent to the image sensor 31 to direct light on the surface of the wafer 60. The light directed by the light source 32 may be, for example, visible light having a wavelength of about 400 nm to 700 nm. However, the inventive concept is not limited thereto, and the light directed by the light source 32 may be infrared light having a wavelength of 700 nm or more, or ultraviolet light having a wavelength of 400 nm or less.

The light source 32 may include, for example, a Light Emitting Diode (LED), but the inventive concept is not limited thereto. For example, the light source 32 may include a Cold Cathode Fluorescent Lamp (CCFL).

In an exemplary embodiment of the inventive concept, the image sensor 31 and the light source 32 are disposed to be adjacent to each other in the image sensor module 30. For example, the light source 32 may direct light at an incident angle θ on the surface of the wafer 60 and receive reflected light from the surface of the wafer 60, the reflected light having the reflection angle θ. The image sensor 31 and the light source 32 may be disposed adjacent to each other. For example, the image sensor 31 receives light, which traveled from the light source 32 to the surface of the wafer 60 without being modulated or reflected by a mirror or half mirror, and which was reflected from the surface of the wafer 60. For example, the light directed from the light source 32 is not modulated, it is reflected from the surface of the wafer 60 in its unmodulated form, and it is received by the image sensor 31 in its unmodulated form.

For example, the image sensor module 30 of the wafer inspection apparatus 1, according to an exemplary embodiment of the inventive concept, acquires a wafer surface image using light which is directed and reflected in a substantially vertical direction with respect to the surface of the wafer 60. Therefore, by receiving the reflected light from the surface of the wafer 60, the light not having been modulated or reflected prior to being reflected from the surface of the wafer 60, a loss of light quantity may be small compared to a case where an image sensor acquires a wafer surface image by receiving modulated light. The modulated light may have a modulated optical path after being reflected by a mirror or a half mirror.

Further, due to the image sensor module 30, which may be arranged in a substantially vertical direction with respect to the surface of the wafer 60, a mirror or a half mirror for modulating the optical path of light may be omitted. Thus, the size of the wafer inspection apparatus 1 may be reduced.

However, the arrangement structure of the image sensor 31 and the light source 32 illustrated in FIG. 3 is merely exemplary. Thus, in other an exemplary embodiment of the inventive concept, an arrangement of the image sensor 31 and the light source 32 other than that in which the image sensor 31 and the light source 32 are disposed substantially vertically above the wafer 60, or the arrangement of the image sensor 31 and the light source 32 shown in FIG. 3, may be employed. For example, the wafer inspection apparatus 1, according to an exemplary embodiment of the inventive concept, may include an image sensor module 30 which is configured such that a wafer 60, serving as an inspection object, is aligned vertically below the image sensor module 30 and can acquire an image of the upper surface of the moving wafer 60 using a line scan method.

Figure 4:
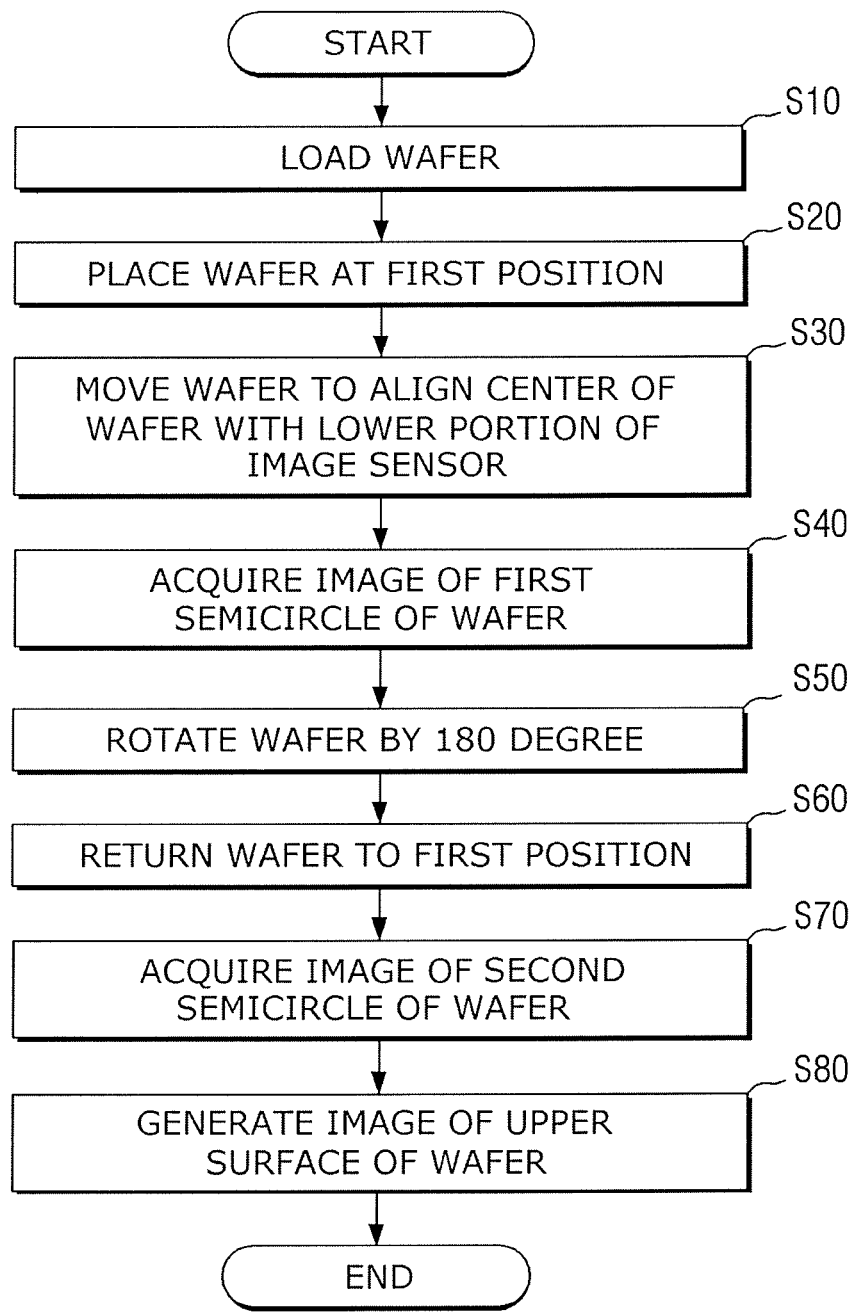
FIG. 4 is a flowchart illustrating a wafer inspection method according to an exemplary embodiment of the inventive concept.

FIG. 4 is a flowchart illustrating a wafer inspection method according to an exemplary embodiment of the inventive concept. FIGS. 5A to 5D are plan views illustrating a wafer inspection method according to an exemplary embodiment of the inventive concept.

Referring to FIG. 4, the wafer inspection method according to an exemplary embodiment of the inventive concept includes loading a wafer 60 on the chuck 11 (S10), placing the wafer 60 at a first position (S20), moving the wafer 60 to align the center of the wafer 60 with a lower portion of the image sensor (S30), acquiring an image of a first semicircle of the wafer 60 (S40), rotating the wafer 60 by 180 degrees (S50), returning the wafer 60 to the first position (S60), acquiring an image of a second semicircle of the wafer 60 (S70), and generating an image of the upper surface of the wafer 60 (S80). Hereinafter, a wafer inspection method, according to an exemplary embodiment of the inventive concept, will be described with reference to FIGS. 5A to 5D.

In FIG. 5A, the wafer 60 is loaded on the chuck 11 (see FIG. 2). The loading of the wafer 60 may be performed, for example, after a photoresist process is completed on the wafer 60, after an etching process is completed on the wafer 60, or after an ion implant process is completed on the wafer 60. For example, the wafer inspection apparatus 1 may be disposed on a wafer transfer path in a transferring process after a photoresist process is completed, or after an etching process is completed to perform a surface inspection of the wafer 60.

The loaded wafer 60 may be aligned with a first position. In this case, the first position may be a position at which an alignment mark, formed on the wafer 60, is aligned with the alignment sensor 50. When the alignment mark is aligned with the alignment sensor 50, the alignment sensor 50 provides an alignment completion signal to the second controller 42. The second controller 42 may determine whether the alignment of the wafer 60 has been completed, and may perform a subsequent process for acquiring an image of the surface of the wafer 60.

Although a case where an alignment mark is formed on the surface of the wafer 60 has been described as an example, the inventive concept is not limited thereto. In an exemplary embodiment of the inventive concept, the wafer 60 might not include an alignment mark formed on its surface, and the alignment sensor 50 may recognize a portion of the circumference of the wafer 60, and provide an alignment completion signal to the second controller 42 upon recognition of the portion of the circumference of the wafer 60.

A first end portion of the wafer 60, the wafer 60 being placed at the first position, may vertically overlap the alignment sensor 50. A second end portion of the wafer 60, opposite (e.g., diametrically opposite) to the first end portion, may vertically overlap with a portion of the image sensor module 30.

Figure 5B:
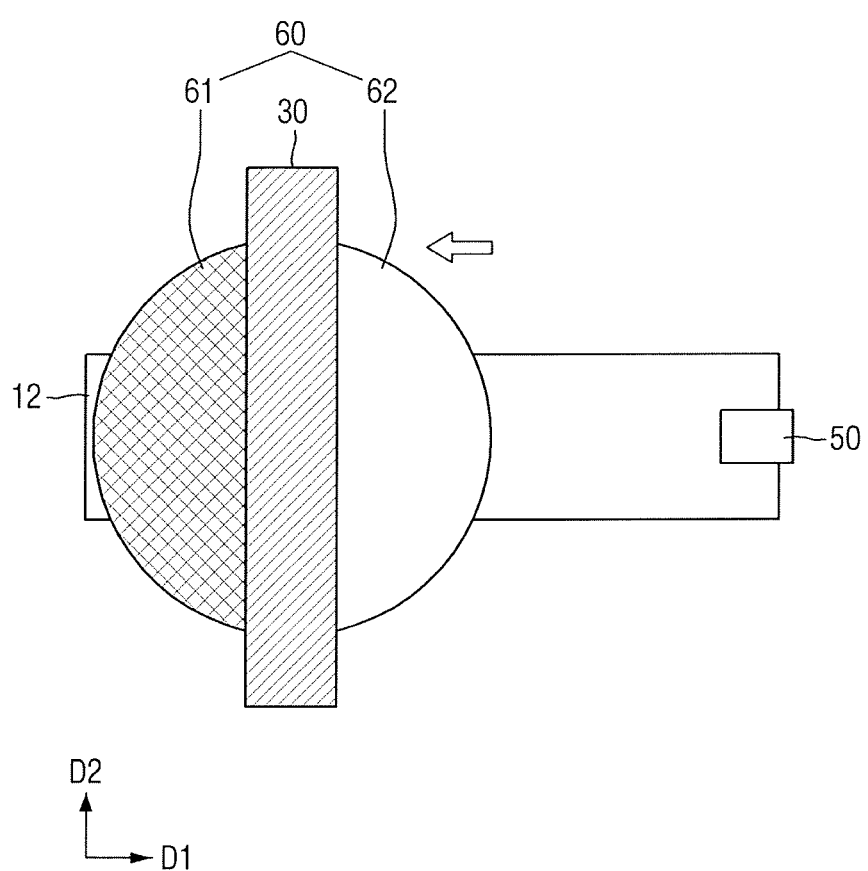

In FIG. 5B, the linear stage 10 (see FIG. 2) moves the wafer 60 along the guide rail 12, extending in the first direction D1, to a position below the image sensor module 30.

In this case, the linear stage 10 (see FIG. 2) may set the location of the wafer 60 such that the center of the wafer 60 is vertically aligned with the image sensor module 30.

Since the wafer 60 moves along the guide rail 12 from the first position shown in FIG. 5A toward the image sensor module 30, a moving distance of the wafer 60 may be substantially equal to a radius of the wafer 60. For example, since the wafer 60 starts movement from the first position, at which opposite ends of the wafer 60 respectively overlap with the alignment sensor 50 and the image sensor module 30, and the wafer 60 moves such that the center of the wafer 60 is aligned with the image sensor module 30, the moving distance of the wafer 60 may be substantially equal to the radius of the wafer 60.

While the wafer 60 moves toward the image sensor module 30 along the guide rail 12, the image sensor module 30 may acquire an image of the surface of the wafer 60.

For example, while the wafer 60 moves along the guide rail 12, the image sensor module 30 acquires an image of the surface of the wafer 60 in a region vertically overlapping the image sensor module 30. The linear stage 10 stops the movement of the wafer 60 when the center of the wafer 60 overlaps with the image sensor module 30. Accordingly, the image sensor module 30 may complete the surface image acquisition of a first semicircle 61 of the wafer 60.

To perform the wafer movement by using the linear stage 10 and the image acquisition of the wafer 60 by using the image sensor module 30 at the same time, the operation of the first controller 41 (see FIG. 1) may be synchronized with the operation of the second controller 42 (see FIG. 2).

For example, while the linear stage 10 moves the wafer 60 along the guide rail under the control of the first controller 41 (see FIG. 1), simultaneously, the second controller 42 (see FIG. 1) controls the image sensor module 30 to initiate the image acquisition of the first semicircle 61 of the wafer 60. Then, when the alignment of the center of the wafer 60 with the image sensor module 30 is completed, the first controller 41 (see FIG. 1) may stop the operation of the linear stage 10, and the second controller 42 (see FIG. 1) may also stop the image acquisition operation of the image sensor module 30.

In this case, whether the center of the wafer 60 has been aligned with the image sensor module 30 is determined by using the image sensor 31 (see FIG. 3) to recognize an alignment mark formed on the wafer 60. However, the inventive concept is not limited thereto, and the first controller 41 may store information on the diameter (e.g., 300 mm) of the wafer 60, and automatically recognize that the center of the wafer 60 has been aligned with the image sensor module 30 when the wafer 60 has moved by a distance corresponding to the radius of the wafer 60 along the guide rail 12.

The second controller 42, that controls the image sensor module 30, may acquire an image of the first semicircle 61 of the wafer 60 and store it temporarily. The temporarily stored image of the first semicircle 61 of the wafer 60 may be combined with an image of a second semicircle 62 of the wafer 60, which may be acquired later. The second controller 42 may generate an image of the surface of the wafer 60 by combining the first and second semicircles 61 and 62. A double-hatched portion in FIG. 5B refers to the first semicircle 61 of the wafer 60.

A generation of the surface image of the double-hatched portion of FIG. 5B (e.g., the double-hatched first semicircle 61) has been completed.

Figure 5C:
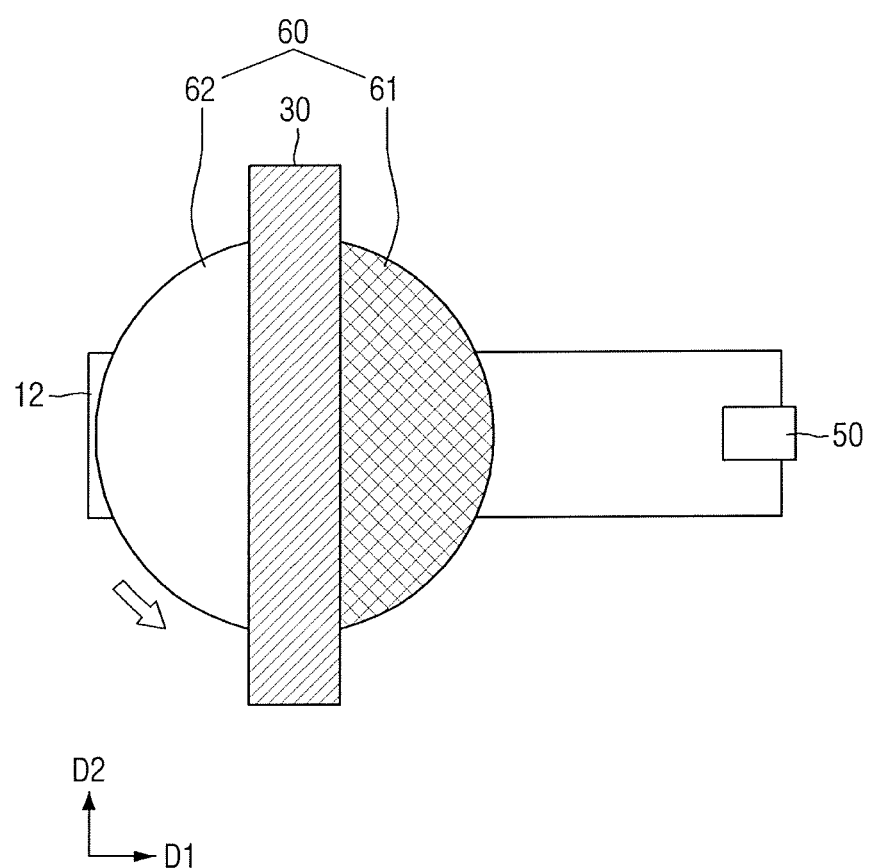

In FIG. 5C, the wafer 60 may be rotated by 180 degrees. For example, the rotary stage 20 may rotate the chuck 11, on which the wafer 60 is loaded, by 180 degrees. In this case, the wafer 60 is rotated while the center of the wafer 60 is still aligned with the image sensor module 30.

During the rotation of the rotary stage 20, the surface image generation of the wafer 60 by the image sensor module 30 is maintained in a stopped state.

In this case, since the image sensor module 30 does not operate during the rotation of the wafer 60, the time required for the rotation of the wafer 60 may be relatively short compared to the moving time on the guide rail 12 for the surface image generation of the first semicircle 61 and the second semicircle 62.

Figure 5D:
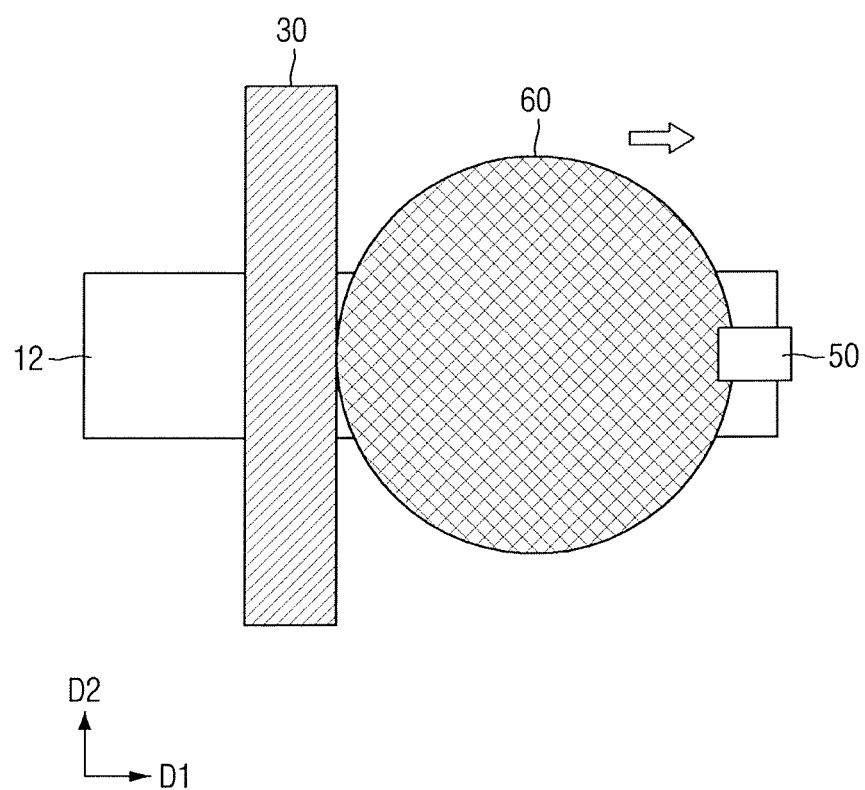

In FIG. 5D, the wafer 60 is moved along the guide rail 12 to be returned to the first position. While the wafer 60 is returned to the first position, the wafer 60 may be aligned by the alignment sensor 50.

The second controller 42 (see FIG. 1) may move the wafer 60 along the guide rail 12 until the alignment mark formed on the wafer 60 is recognized by the alignment sensor 50 to provide an alignment completion signal to the second controller 42. Alternatively, in an exemplary embodiment of the inventive concept, the wafer 60 may be returned to the first position by moving the wafer 60 in an opposite direction by the moving distance of the wafer 60 which has been moved by the linear stage 10 (see FIG. 1) in FIG. 5B without operating the alignment sensor 50.

When the wafer 60 begins to move to the first position, the image sensor module 30 starts an operation of acquiring a surface image of the wafer 60. For example, the image acquisition operation, using the image sensor module 30, may be initiated with respect to the second semicircle 62 of the wafer 60, the image of which has not been acquired by the image sensor module 30.

In this case, the operation of the linear stage 10 (see FIG. 1) may be synchronized with the operation of the image sensor module 30 by the first and second controllers 41 and 42 (see FIG. 1). Thus, while the first controller 41 (see FIG. 1) uses the linear stage 10 (see FIG. 1) to return the wafer 60 to the first position, simultaneously, the second controller 42 (see FIG. 1) may initiate the image generation operation of the second semicircle 62 of the wafer 60.

Further, when the wafer 60 is returned to the first position and the first controller 41 (see FIG. 1) stops the movement of the wafer 60, and the second controller 42 (see FIG. 1) may stop the surface image acquisition of the wafer 60.

Thus, through a process of FIGS. 5A to 5D, the wafer 60 passes through a region below the image sensor module 30 to acquire an image of each of the first semicircle 61 and the second semicircle 62 of the wafer 60.

Figure 6:
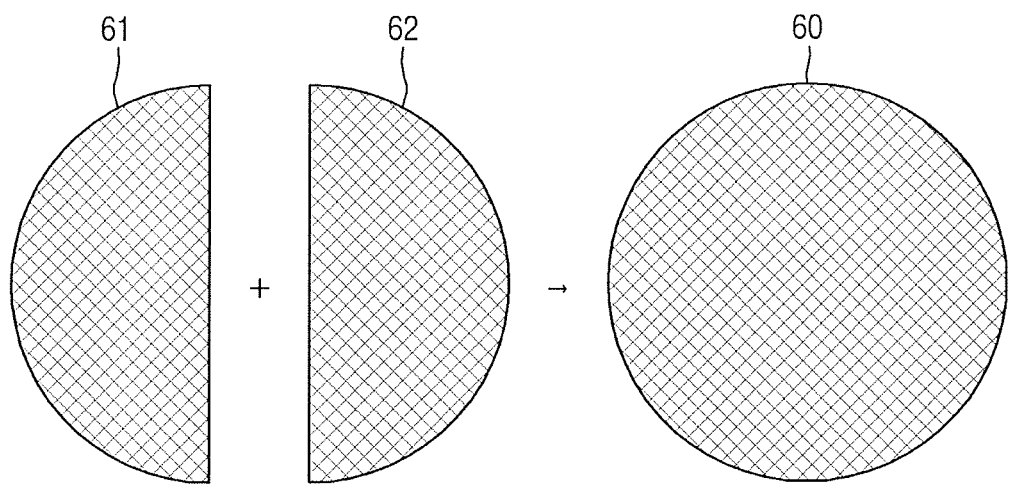
FIG. 6 is a diagram illustrating a wafer surface image generated by a wafer inspection method, according to an exemplary embodiment of the inventive concept.

FIG. 6 is a diagram illustrating a wafer surface image generated by a wafer inspection method, according to an exemplary embodiment of the inventive concept.

Referring to FIG. 6, the entire surface image of the wafer 60 may be obtained by combining the previously acquired images of the first semicircle 61 and the second semicircle 62 of the wafer 60. In this case, since the wafer 60 has been rotated by 180 degrees, to generate a correct image of the wafer 60, one of the images of the first semicircle 61 and the second semicircle 62 may be vertically flipped.

As described above, by the wafer inspection apparatus 1 and the wafer inspection method using the same, according to an exemplary embodiment of the inventive concept, the wafer surface image for the wafer inspection can be obtained. In the wafer inspection apparatus 1, to obtain an image of the entire surface of the wafer 60, the surface of the wafer 60 may be scanned at least one time by using the image sensor 31, or the like.

In this case, to scan the entire surface of the wafer 60 by moving the image sensor 31, or to scan the entire surface of the wafer 60 by moving the wafer 60 with respect to the image sensor 31, the image sensor 31 or the wafer 60 may be moved by a distance equal to the diameter of the wafer 60. Further, a space required for the movement for wafer inspection may be a space corresponding to at least twice the diameter of the wafer 60.

However, in the wafer inspection apparatus 1 and the wafer inspection method using the same, according to an exemplary embodiment of the inventive concept, the moving distance of the wafer 60, which is moved by the linear stage 10, may be substantially equal to the radius of the wafer 60. Thus, the time it takes for the wafer 60 to be moved during the wafer inspection may be decreased and a throughput of wafer inspection operation may be increased.

Further, a space required for the movement of the wafer 60 during the wafer inspection operation can be reduced by as much as the radius of the wafer 60.

Figure 7:
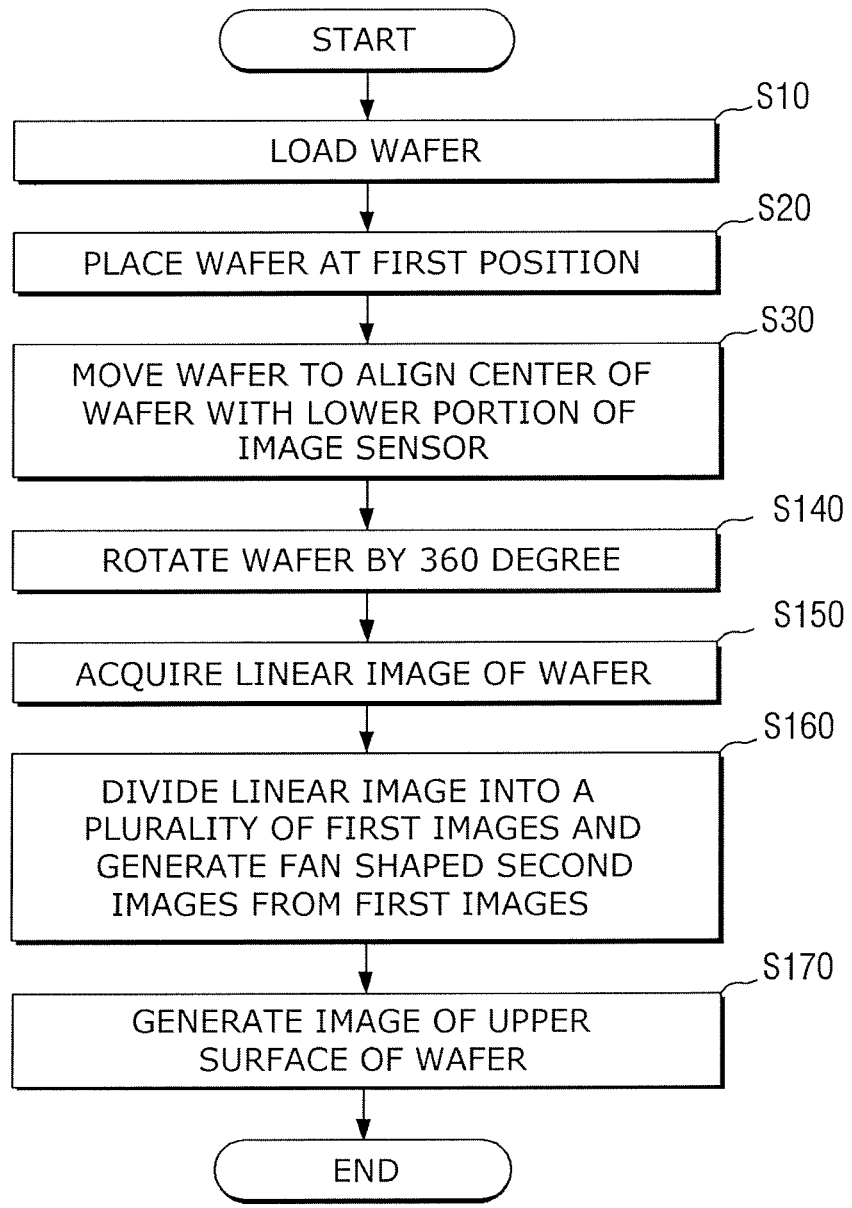
FIG. 7 is a flowchart illustrating a wafer inspection method according to an exemplary embodiment of the inventive concept.

FIG. 7 is a flowchart illustrating a wafer inspection method according to an exemplary embodiment of the inventive concept. FIGS. 8A to 8D are plan views illustrating a wafer inspection method according to an exemplary embodiment of the inventive concept.

Referring to FIG. 7, the wafer inspection method includes loading a wafer 60 on the chuck 11 (S110), placing the wafer 60 at a first position (S120), moving the wafer 60 to align the center of the wafer 60 with a lower portion of the image sensor module (S130), rotating the wafer 60 by 180 degrees (S140), acquiring a linear image of the wafer 60 (S150), dividing the linear image of the wafer 60 into a plurality of first images and generating second images that are fan-shaped images from the plurality of first images (S160), and generating an image of the upper surface of the wafer 60 (S170). Hereinafter, the wafer inspection method, according to an exemplary embodiment of the inventive concept, will be described with reference to FIGS. 8A to 8D.

Figure 8A:
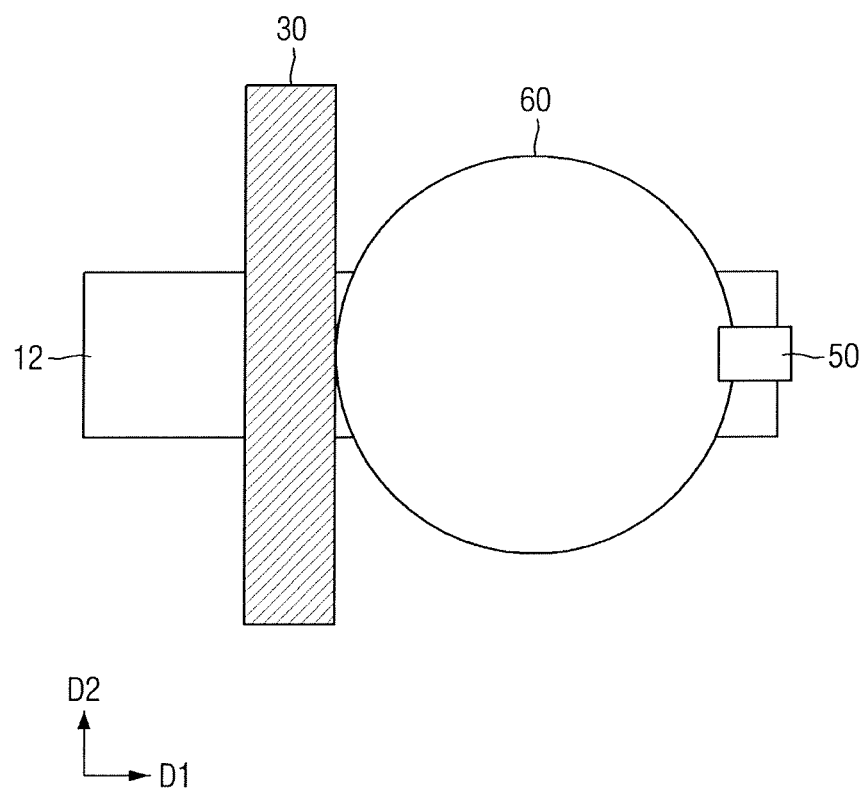
FIGS. 8A to 8D are plan views illustrating a wafer inspection method according to an exemplary embodiment of the inventive concept.

In FIG. 8A, the wafer 60 is loaded on the chuck 11, and the wafer 60 is aligned at a first position. The loaded wafer 60 may be aligned at the first position by using the alignment sensor 50. The alignment sensor 50 generates an alignment completion signal by recognizing an alignment mark formed on the wafer 60 and provides the alignment completion signal to the second controller 42. The second controller 42 receives the alignment completion signal provided by the alignment sensor 50 and determines whether the alignment of the wafer 60 has been completed. Then, the second controller 42 may move the wafer 60 to acquire an image of the surface of the wafer 60.

Figure 8B:
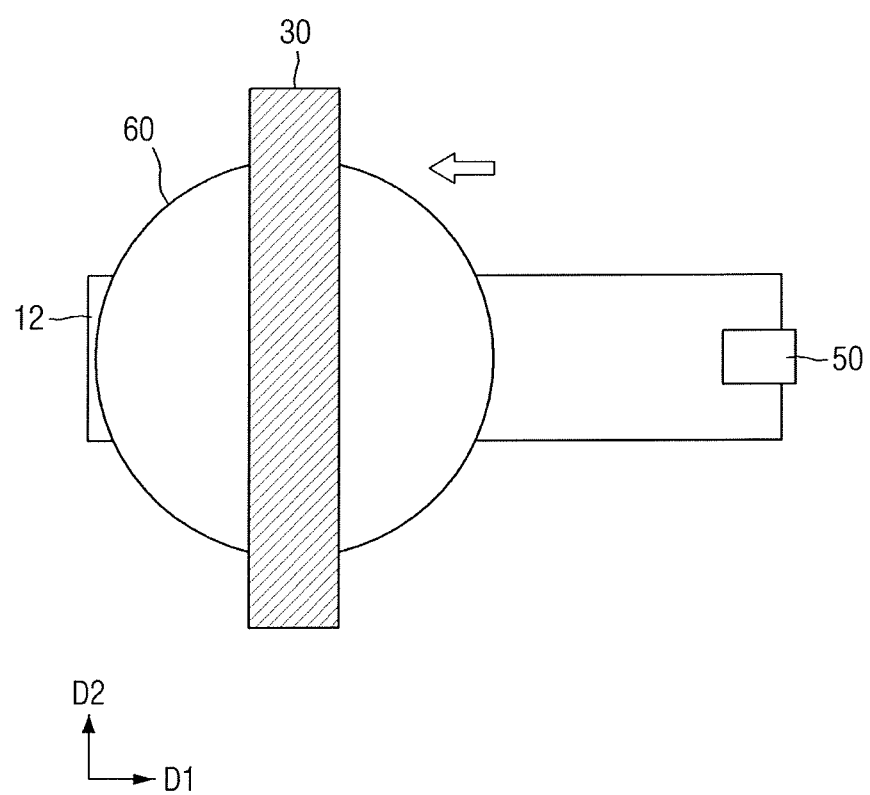

In FIG. 8B, the linear stage 10 (see FIG. 2) moves the wafer 60 along the guide rail 12, extending in the first direction D1, to a position below the image sensor module 30. When the center of the wafer 60 is vertically aligned with the image sensor module 30, the movement of the wafer 60 in the first direction D1 may be completed.

Whether the center of the wafer 60 has been aligned with the image sensor module 30 may be determined by identifying the alignment mark formed at the center of the wafer 60 by using the image sensor module 30, or checking whether the wafer 60 has been moved along the guide rail 12 by a predetermined radius of the wafer 60.

While the wafer 60 is moved on the guide rail 12 by the linear stage 10 (see FIG. 2), the image sensor module 30 might not acquire an image of the surface of the wafer 60.

Thus, by using the first controller 41 (see FIG. 1) and the second controller 42 (see FIG. 2), the linear stage 10 (see FIG. 1) and the image sensor module 30 might not operate at the same time.

Further, since the image sensor module 30 might not acquire an image of the surface of the wafer 60 while the wafer 60 is moving, the moving speed of the wafer 60, along the guide rail 12, may be fast.

Figure 8C:
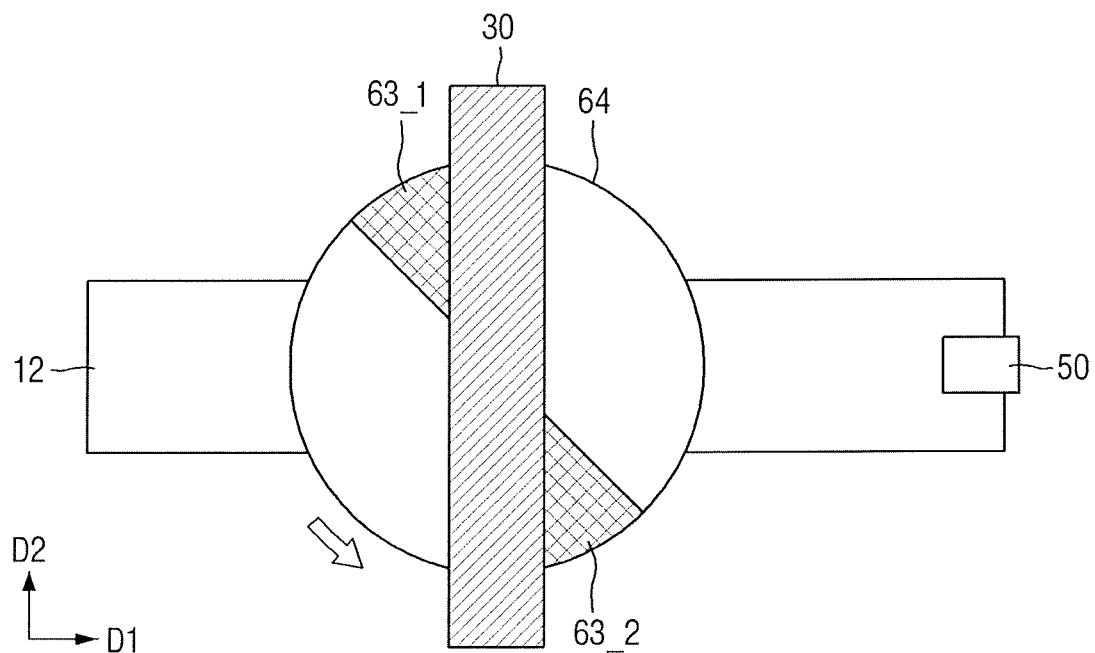

In FIG. 8C, in a state where the center of the wafer 60 is aligned with the image sensor module 30, the wafer 60 is rotated by the rotary stage 20 (see FIG. 2). The rotary stage 20 (see FIG. 2) may rotate the wafer 60 by 180 degrees.

The rotation of the wafer 60 by the rotary stage 20 (see FIG. 2) may be synchronized with the surface image acquisition of the wafer 60 by the image sensor module 30. Accordingly, the second controller 42 (see FIG. 1) may simultaneously control the first controller 41 and the image sensor module 30 such that the rotation of the rotary stage 20 (see FIG. 2) and the image acquisition of the image sensor module 30 can be performed at the same time.

A generation of the surface image of the double-hatched portion 63 of FIG. 8C has been completed. A surface image generation of the remaining portion 64 of the wafer 60 has not been completed by the image sensor module 30. For example, a first region 30_1 of the image sensor module 30 acquires a surface image of a first portion 63_1 of the wafer 60, and a second region 30_2 of the image sensor module 30 acquires a surface image of a second portion 63_2 of the wafer 60. Thus, as the rotary stage 20 (see FIG. 2) rotates the wafer 60 by 180 degrees, a linear image for the entire area of the wafer 60 can be obtained. The image sensor module 30 generates the surface image of the rotating wafer 60 in the form of a linear image as shown in FIG. 9A.

Figure 9A:
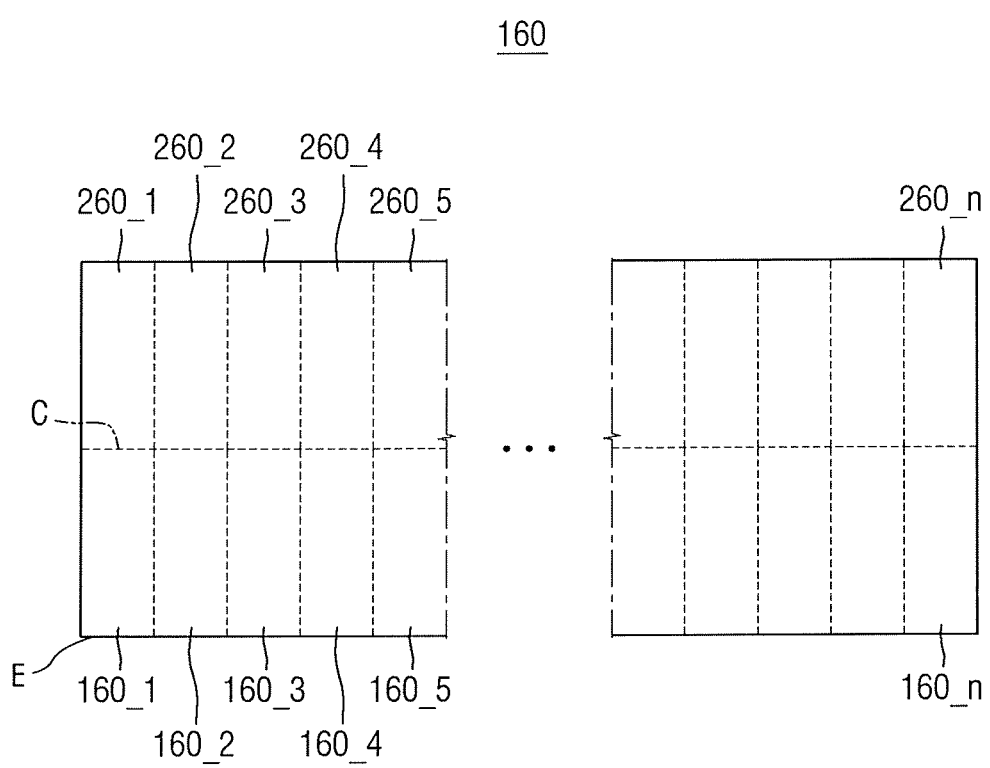
FIGS. 9A and 9B are diagrams illustrating a wafer surface image generated by a wafer inspection method, according to an exemplary embodiment of the inventive concept.
Figure 9B:
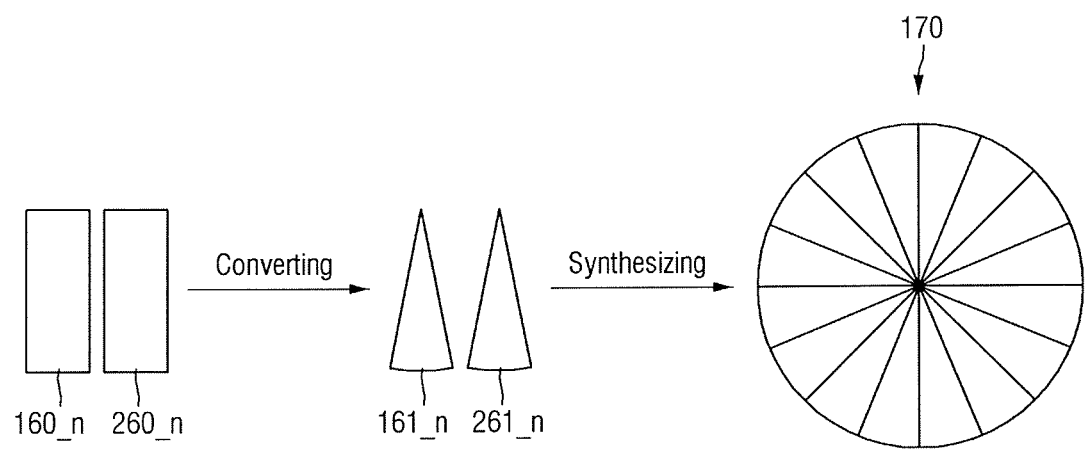

FIGS. 9A and 9B are diagrams illustrating a wafer surface image generated by a wafer inspection method, according to an exemplary embodiment of the inventive concept.

Referring to FIG. 9A, a linear image 160 is generated by the surface image acquisition of the image sensor module 30 as described above. A center C of the linear image 160 is a part of the image generated in the region of the image sensor module 30 where the center of the wafer 60 is located. In this case, portions 160_1, 160_2, ..., 160_n of the half of the linear image are generated by the first region 30_1 of the image sensor module, and portions 260_1, 260_2, ..., 260_n of the other half of the linear image are generated by the second region 30_2 of the image sensor module. The second controller 42 (see FIG. 1) divides the linear image 160 into a plurality of first sub-images 160_1, 160_2, ..., 160_n, 260_1, 260_2, ..., 260_n.

Referring to FIG. 9B, the plurality of first sub-images 160_1 to 160_n and 260_1 to 260_n are converted into a plurality of second sub-images 161_1 to 161_n and 261_1 to 261_n, that are fan-shaped images. The conversion of the first sub-images 160_n and 260_n into the second sub-images 161_n and 261_n may be achieved by reducing the width of the first sub-images 160_n and 260_n at a ratio inversely proportional to a distance from the center C of the linear image 160 to one end E. For example, since an image of each portion of the wafer 60 rotating at the same angular velocity is captured by the image sensor module 30, the surface image of the wafer 60 acquired by the image sensor module 30 becomes the linear image 160. To correct the linear image into a circular surface image of the wafer 60, the first sub-images 160_n and 260_n are respectively converted into the second sub-images 161_1 to 161_n and 261_1 to 261_n by reducing the width of a portion of each image 160_1 to 160_n and 260_1 to 260_n by a ratio inversely proportional to the distance from the center C to the portion of each image 160_1 to 160_n and 260_1 to 260_n.

Subsequently, the converted second sub-images 161_1 to 161_n and 261_1 to 261_n are combined to generate a circular wafer surface image 170.

The division of the linear image 160, the conversion of the first sub-images 160_1 to 160_n and 260_1 to 260_n into the second sub-images 161_1 to 161_n and 261_1 to 261_n and the generation of the wafer surface image 170 from the second sub-images 161_1 to 161_n and 261_1 to 261_n may be performed by the second controller 42 (see FIG. 1).

Figure 8D:
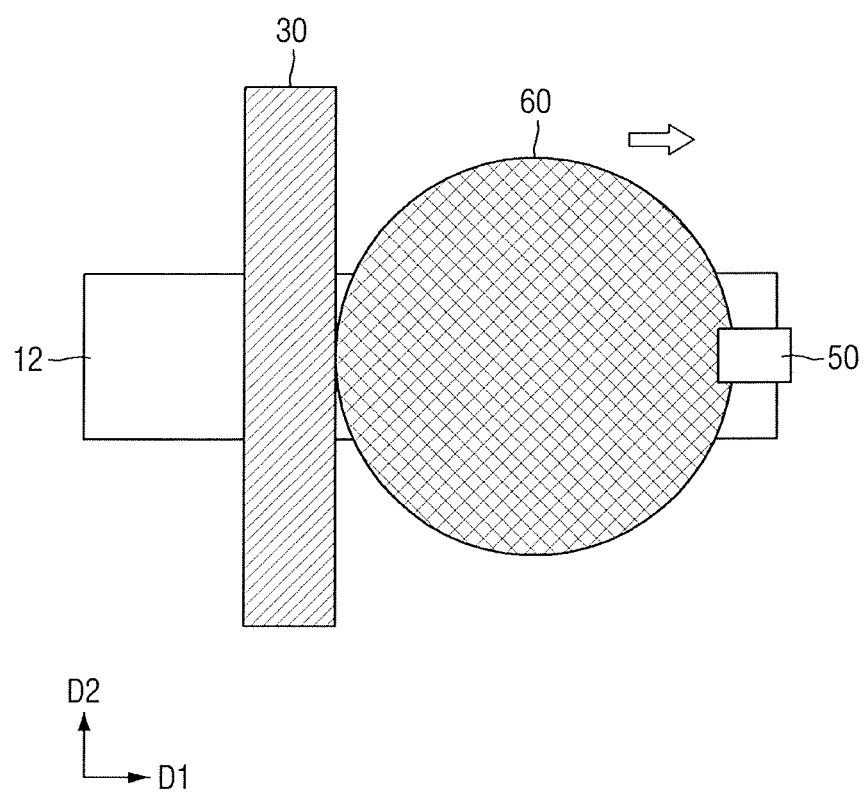

Referring to FIG. 8D, the wafer 60 is moved along the guide rail 12 to be returned to the first position. The wafer 60 may be aligned by the alignment sensor 50 while being returned to the first position.

While the inventive concept has been particularly shown and described with reference to exemplary embodiments thereof, it will be apparent to those of ordinary skill in the art that various changes in form and detail may be made therein without departing from the spirit and scope of the inventive concept.

What is claimed is:

1. A wafer inspection method, comprising:
   loading a wafer, disposed on a chuck, onto a rotary stage configured to rotate the chuck and a linear stage configured to move the chuck along a guide rail, wherein the linear stage is configured to move the chuck a distance substantially equal to a radius of the wafer;
   placing the wafer in a first position;
   moving the wafer in a first direction to align a center of the wafer with a first portion of an image sensor;
   acquiring an image of a surface of the wafer using the image sensor;
   rotating the wafer by a predetermined angle; and
   unloading the wafer, wherein the acquiring of an image of the surface of the wafer comprises:
   acquiring an image of a first semicircle of the wafer while moving the wafer from the first position to aligning the center of the wafer with the first portion of the image sensor;
   rotating the wafer by 180 degrees; and
   acquiring an image of a second semicircle of the wafer while returning the wafer to the first position.

2. The wafer inspection method of claim 1, further comprising generating an image of the surface of the wafer by combining the image of the first semicircle of the wafer with the image of the second semicircle of the wafer.

3. The wafer inspection method of claim 1, wherein the placing of the wafer at the first position comprises aligning an alignment mark disposed on the wafer with an alignment sensor.

* * * * *